US011345292B2

(12) United States Patent
Kim et al.

(10) Patent No.: US 11,345,292 B2
(45) Date of Patent: May 31, 2022

(54) VEHICLE CRUISE CONTROL SENSOR-COVER AND METHOD OF MANUFACTURING THE SAME

(71) Applicants: INTOPS. CO., LTD., Gyeonggi-do (KR); Keun Ha Kim, Gyeonggi-do (KR)

(72) Inventors: Keun Ha Kim, Gyeonggi-do (KR); Tae Yong Hong, Gyeonggi-do (KR); Hong Il Lee, Gyeonggi-do (KR)

(*) Notice: Subject to any disclaimer, the term of this patent is extended or adjusted under 35 U.S.C. 154(b) by 899 days.

(21) Appl. No.: 16/093,815

(22) PCT Filed: May 18, 2018

(86) PCT No.: PCT/KR2018/005702
§ 371 (c)(1),
(2) Date: Oct. 15, 2018

(87) PCT Pub. No.: WO2019/066184
PCT Pub. Date: Apr. 4, 2019

(65) Prior Publication Data
US 2020/0361399 A1    Nov. 19, 2020

(30) Foreign Application Priority Data
Sep. 29, 2017    (KR) .................. 10-2017-0127542

(51) Int. Cl.
*B60R 19/48*      (2006.01)
*B60R 13/00*      (2006.01)
(Continued)

(52) U.S. Cl.
CPC .......... *B60R 13/005* (2013.01); *B23K 26/361* (2015.10); *B29C 45/14688* (2013.01);
(Continued)

(58) Field of Classification Search
CPC .......... B60R 13/05; B60R 19/48; C23C 16/00
(Continued)

(56) References Cited

U.S. PATENT DOCUMENTS 7,846,498 B2 * 12/2010 Ido ...................... C23C 14/0015
427/248.1
8,702,135 B2 * 4/2014 Gaboury ............... B60R 13/005
293/121
(Continued)

FOREIGN PATENT DOCUMENTS

JP    2008024254    7/2008
JP    5662666       4/2015
(Continued)

OTHER PUBLICATIONS

International Search Report for PCT/KR2018/005702 dated Aug. 28, 2018.
Written Opinion for PCT/KR2018/005702 dated Aug. 28, 2018.

*Primary Examiner* — D Glenn Dayoan
*Assistant Examiner* — Sunsurraye Westbrook
(74) *Attorney, Agent, or Firm* — KORUS Patent, LLC; Seong Il Jeong

(57) ABSTRACT

The present disclosure provides a vehicle cruise control sensor-cover and a method of manufacturing the vehicle cruise control sensor-cover, the vehicle cruise control sensor-cover including a bottom cover member wherein indium or an indium-containing alloy is deposited, by using a non-conductive vacuum metallization (NCVM) method, on a front surface of a bottom cover body having a logo and an outer frame protruding three-dimensionally and a top cover body including a transparent material and having a back surface formed in a shape corresponding to the front surface of the bottom cover member, wherein the top cover member is assembled integrally with the front surface of the bottom cover member, and a laser etching process is partially selectively performed only on the logo or the outer edge on the back surface of the top cover body to partially form an etched surface.

1 Claim, 4 Drawing Sheets

(51) Int. Cl.
*B23K 26/361* (2014.01)
*B29C 45/14* (2006.01)
*B23P 15/00* (2006.01)

(52) U.S. Cl.
CPC ..... *B23P 15/00* (2013.01); *B29C 2045/14713* (2013.01); *Y10T 29/49885* (2015.01); *Y10T 29/49982* (2015.01)

(58) Field of Classification Search
USPC ............... 293/102, 117, 155, 120, 121, 122; 296/30, 29, 197.01; 343/713, 872
See application file for complete search history.

(56) References Cited

U.S. PATENT DOCUMENTS

| | | | |
|---|---|---|---|
| 8,974,712 B2* | 3/2015 | Ohtake | H01Q 1/42 264/255 |
| 9,114,760 B2* | 8/2015 | Mayer Pujadas | H01Q 1/3283 |
| 2015/0226836 A1 | 8/2015 | Shim et al. | |

FOREIGN PATENT DOCUMENTS

| KR | 101074677 | 10/2011 |
|---|---|---|
| KR | 1020150095411 | 8/2015 |
| KR | 101586369 | 1/2016 |
| KR | 1020170103371 | 9/2017 |

\* cited by examiner

VEHICLE CRUISE CONTROL SENSOR-COVER AND METHOD OF MANUFACTURING THE SAME

CROSS REFERENCE TO RELATED APPLICATIONS

This application is the National Stage of International Application No. PCT/KR2018/005702, having an International Filing Date of 18 May 2018, which designated the United States of America, and which claims priority from and the benefit of Korean Patent Application No. 10-2017-0127542, filed on 29 Sep. 2017, the disclosures of which are incorporated herein by reference in their entireties.

BACKGROUND

1. Field

The present disclosure relates to a vehicle cruise control sensor-cover and a method of manufacturing the same, and more particularly, to a vehicle cruise control sensor-cover that has a metallic color and material, is abrasion resistant and weather resistant, ensures electromagnetic transparency of a cruise control sensor, and does not hinder logo design, and a method of manufacturing the same.

2. Description of Related Developments

In general, logos and emblems are trademarks, letters, symbols, or a combination thereof, which are used to represent a symbol or image of a company or organization. In the case of companies manufacturing products, a logo of the company is attached to a surface of the product not only to display the origin of the product but also to advertise the company or product.

In particular, in the case of a vehicle, a hood top, and a wheel cap on front and rear sides of the vehicle, and a side trim or a gear knob are often used to advertise a vehicle manufacturer by attaching a logo and an emblem of the vehicle manufacturer.

In recent years, such an emblem does not merely express the origin of the products such as vehicles, but also emphasizes an aesthetic sense that appears in harmony with the exterior design of the vehicle or an aesthetic sense of the emblem itself. Accordingly, emblems having shapes that enhance a three-dimensional feeling by moving away from the conventional simple planar design have been proposed.

Accordingly, the inventor has proposed a three-dimensional emblem of Korean Patent No. 10-1074677, wherein the three-dimensional emblem is attached to a shadow plate on which a shadow portion in which brightness gradually changes at a boundary surface of a three-dimensional logo forms, couples the shadow plate having the three-dimensional logo to a base housing having a storage space therein and having a flat plate-like lower portion to facilitate attachment to a vehicle or the like, thereby enhancing a natural depth effect and a three-dimensional effect by a shadow effect around the three-dimensional logo. Such a three-dimensional emblem conveys the three-dimensional effect only by a mechanical structure and the three-dimensional effect of the emblem may be further improved when the three-dimensional emblem is exposed to external sunlight or illumination. However, since components of the emblem are separately molded and assembled, the manufacturing process is complicated and the manufacturing cost increases accordingly.

Furthermore, in recent years, smart cruise control, which is 'cruise control' or 'automatic cruise control' that keeps the speed of a vehicle at a constant level, is implemented by providing sensors on the front and rear of the vehicle. People can drive a vehicle with the smart cruise control within a speed limit and at an economic speed without having to watch a speedometer.

A smart cruise control sensor is attached to a radiator grill of a vehicle to locate an obstacle in front of the vehicle and control the vehicle speed through a controller.

Thus, it is possible to locate the obstacle in front of the vehicle through the smart cruise control sensor by using electric waves emitted from the smart cruise control sensor.

However, conventional vehicle cruise control sensor-covers are positioned in the grill of a vehicle, which impedes the continuity of a grill design and hinders an aesthetic sense of the vehicle, thus narrowing design choice when designing the vehicle.

SUMMARY

Provided are a vehicle cruise control sensor-cover that has a metallic color and material, is abrasion resistant and weather resistant, ensures electromagnetic transparency of a cruise control sensor, and does not hinder logo design and a method of manufacturing the same.

According to an aspect of the present disclosure, a vehicle cruise control sensor-cover includes: a bottom cover member wherein indium or an indium-containing alloy is deposited, by using a non-conductive vacuum metallization (NCVM) method, on a front surface of a bottom cover body having a logo and an outer frame protruding three-dimensionally; and a top cover body including a transparent material and having a back surface formed in a shape corresponding to the front surface of the bottom cover member, wherein the top cover member is assembled integrally with the front surface of the bottom cover member, and a laser etching process is partially selectively performed only on the logo or the outer edge on the back surface of the top cover body to partially form an etched surface.

The bottom cover member according to the present disclosure includes: the bottom cover body formed of a colored synthetic resin material and having the logo and an outer edge protruding three-dimensionally on the front surface of the bottom cover body; a non-conductive deposition layer formed on the front surface of the bottom cover body to secure electromagnetic transparency of the bottom cover body; and a protective layer coated on a front surface of the non-conductive deposition layer to protect the non-conductive deposition layer.

The top cover member according to the present disclosure includes: a transparent top cover body formed of a transparent synthetic resin material and having a back surface formed in the shape corresponding to the front surface of the bottom cover body; a hard coating layer formed on a front surface of the top cover body by a coating process or an injection process using an injection mold; and a partially colored layer formed by selectively coloring either of surfaces corresponding to the logo, the outer frame, and a logo base on the back surface of the top cover body.

Furthermore, according to an aspect of the present disclosure, a method of manufacturing a vehicle cruise control sensor-cover, the method including: a) preparing a bottom cover member having a logo, an outer frame, and a logo base protruding three-dimensionally on a front surface of the bottom cover member; b) preparing a top cover member having a back surface formed in a shape corresponding to the logo, the outer frame, and the logo base formed on the front surface of the bottom cover member; and c) assembling the top cover member integrally with the bottom cover member after positioning the back surface of the top cover member on the front surface of the bottom cover member, wherein the b) preparing of the top cover member includes: b-1) injecting a transparent synthetic resin by using an injection mold to form the top cover body having the back surface formed in a shape corresponding to the front surface of the bottom cover member; b-2) forming a hard coating layer on the front surface of the top cover body by coloring or by using the injection mold; b-3) selectively partially coloring the bottom surface of the top cover body to form a colored layer or a partially colored layer; and b-4) selectively partially performing laser etching on the back surface of the top cover body to form an etched surface.

The a) preparing of the bottom cover member according to the present disclosure includes: a-1) injecting a colored synthetic resin using the injection mold to form a colored bottom cover body having the logo, the outer frame, and the logo base protruding three-dimensionally; a-2) forming a non-conductive deposition layer by depositing, by using a non-conductive vacuum metallization (NCVM) method, indium or an indium-containing alloy on the front surface of the bottom cover body having the logo, the outer frame, and the logo base protruding three-dimensionally; and a-3) forming a protective layer by coloring a surface of the non-conductive deposition layer formed on the front surface of the bottom cover body with a protective paint or a protective deposition material.

The b-3) selective partial coloring of the bottom surface of the top cover body to form a partially colored layer according to the present disclosure includes: forming a partially colored layer only on a surface corresponding to the logo base, which is a portion excluding a surface corresponding to the logo and the outer frame on the back surface of the top cover body.

A vehicle cruise control sensor-cover and a method of manufacturing the same according to an embodiment of the present disclosure have the following effects.

First, a non-conductive deposition layer is formed on the front surface of a colored bottom cover member by a non-conductive vacuum metallization (NCVM) method to realize a metallic color and material as well as an electromagnetic transparency.

Second, a hard coating layer and a non-conductive deposition layer are formed on respective parts, so that a defective rate of products is reduced as compared with a conventional case in which the hard coating layer and the non-conductive deposition layer are simultaneously formed on one member, a scrap removal process is not required, and manufacturing costs are reduced.

Third, a hard coating layer is formed by insert injection using a top cover body, so that a defective rate of products is reduced and the yield is improved as compared with the conventional case in which the hard coating layer is formed by a coating process.

Fourth, a colored layer representing color and an etched surface reflecting light at multiple angles are formed to be opposed to each other, thereby maximizing the three-dimensional effect of a logo.

DETAILED DESCRIPTION

Figure 1:
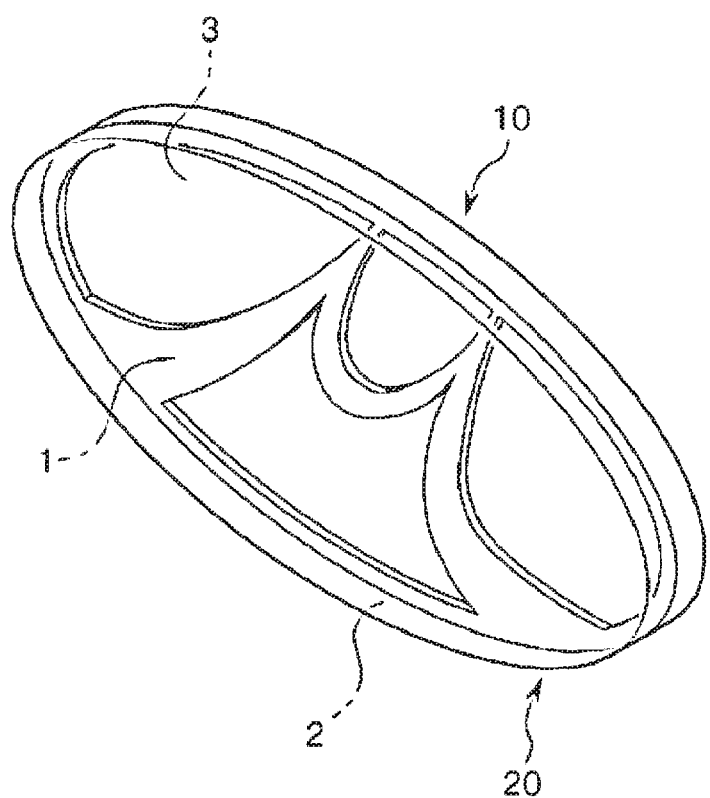
FIG. 1 is an exemplary view of a vehicle cruise control sensor-cover according to an embodiment of the present disclosure.

Reference will now be made in detail to embodiments of the present disclosure, examples of which are illustrated in the accompanying drawings. However, terms and words used in the present specification and claims should not be construed as being limited to ordinary or dictionary meanings, but should be construed as meanings and concepts consistent with the inventive concept based on the principle that the inventor can properly define the concepts of terms in order to explain his or her invention in the best way.

Therefore, embodiments described in the present specification and configurations shown in the drawings are only the most preferred embodiments of the present disclosure and do not represent the inventive concept. Accordingly, it should be understood that there are equivalent variations that may be substituted at the time of the present application.

The present disclosure relates to a vehicle cruise control sensor-cover that has a metallic color and material, is abrasion resistant and weather resistant, ensures electromagnetic transparency of a cruise control sensor, and does not hinder logo design and a method of manufacturing the same, and embodiments of which are illustrated in the accompanying drawings.

Figure 2:
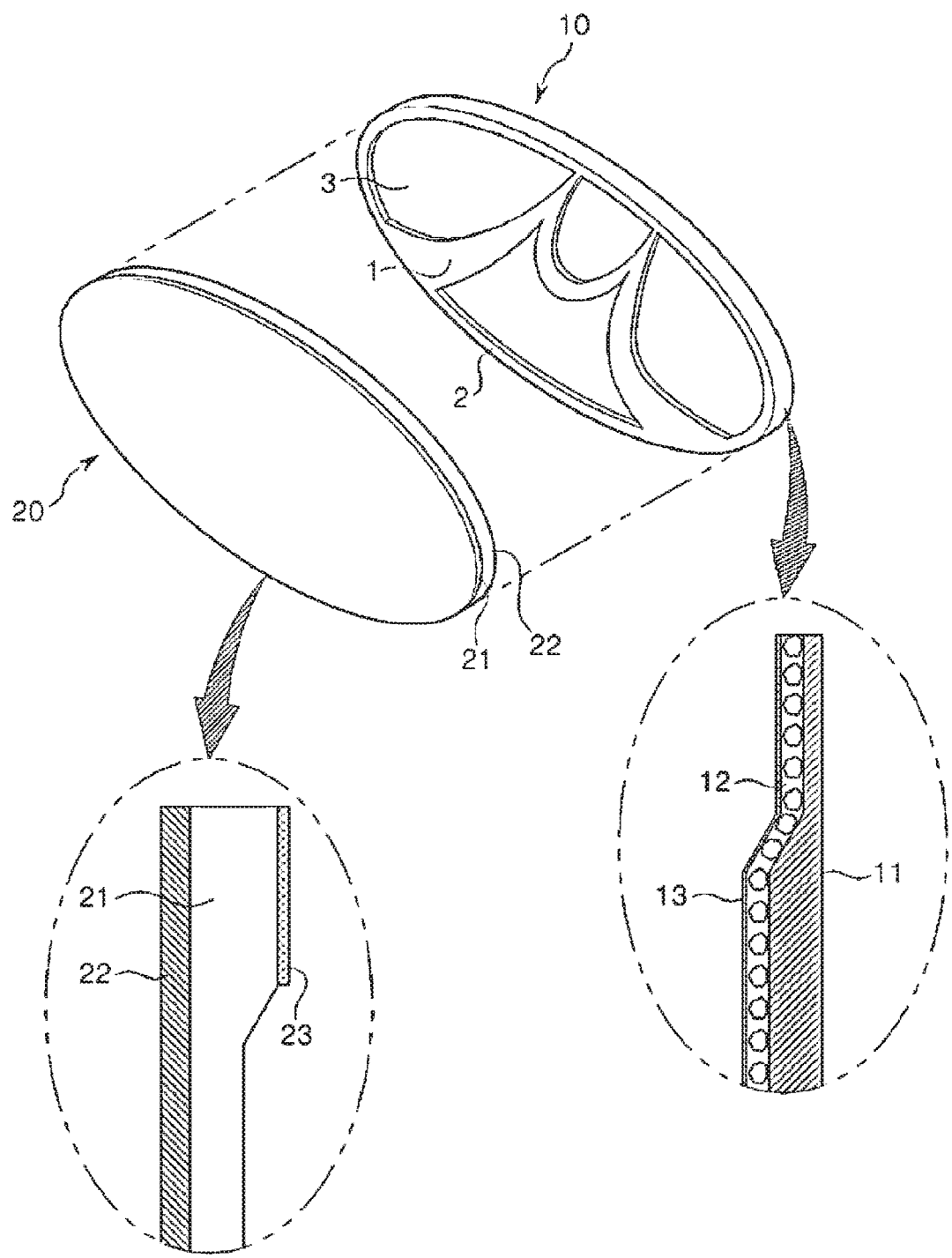
FIG. 2 is an exemplary view of a bottom cover member and a top cover member according to an embodiment of the present disclosure.

A bottom cover member 10 and a top cover member 20 are integrally assembled in the vehicle cruise control sensor-cover according to an embodiment of the present disclosure with reference to FIGS. 1 and 2. In the bottom cover member 10, indium or an indium-containing alloy is deposited, by a non-conductive vacuum metallization (NCVM) method, on a front surface of a body in which a logo 1 and an outer frame 2 protrude three-dimensionally. The top cover member 20 includes a transparent material and has a back surface formed in a shape corresponding to a front surface of the bottom cover member 10. The top cover member 20 is assembled integrally with the front surface of the bottom cover member 10 to form the vehicle cruise control sensor-cover.

The bottom cover member 10 according to an embodiment of the present disclosure includes a bottom cover body 11 formed of a colored synthetic resin material and having a logo and an outer edge protruding three-dimensionally on a front surface, a non-conductive deposition layer 12 formed on the front surface of the bottom cover body 11 to secure electromagnetic transparency of the bottom cover body 11, and a protective layer 13 coated or deposited on a front surface of the non-conductive deposition layer 12 to protect the non-conductive deposition layer 12.

The top cover member 20 includes a transparent top cover body 21 formed of a transparent synthetic resin material and having a back surface formed in a shape corresponding to the front surface of the bottom cover body 11, a hard coating layer 22 formed on a front surface of the top cover body 21 by an injection process or a coating process using an injection mold, and a partially colored layer 23 formed by selectively coloring either of surfaces corresponding to the logo 1, the outer frame 2, and a logo base 3 on the back surface of the top cover body 21.

A laser etching process may be partially selectively performed only on the logo 1 or the outer edge 2 on the back surface of the top cover body 21 to partially form an etched surface.

Referring to FIGS. 1 to 4, the method of manufacturing a vehicle cruise control sensor-cover according to an embodiment of the present disclosure includes preparing the bottom cover member 10, preparing the top cover member 20, and assembling the bottom cover member 10 and the top cover member 20 together.

First, in operation a), the bottom cover member 10 having the logo 1, the outer frame 2, and the logo base 3 protruding three-dimensionally on the front surface is prepared.

Hereinafter, operation a) of preparing the bottom cover member 10 will be described in detail.

In operation a-1), a colored synthetic resin is injected using an injection mold to form the colored bottom cover body 11 having the logo 1, the outer frame 2, and the logo base 3 protruding three-dimensionally.

Since the injection mold is a general injection mold, a detailed description thereof will be omitted. However, when forming the bottom cover body 11, it is preferable to form the bottom cover body 11 by maintaining the injection mold at a temperature of 80° C. and injecting the colored cover material 11 melted at 260° C. into the injection mold.

The bottom cover body 11 is black, which is contrasted with the logo 1 having a metallic color and texture so that the logo 1 stands out. Although the bottom cover body 11 according to an embodiment of the present disclosure is described as being manufactured in black, the present disclosure is not limited thereto and other colors may be employed.

In order to remove foreign materials from the bottom cover body 11 injected by the injection mold, a cleaning and discharging process is performed with ethanol or an IPA cleaner so that foreign materials and static electricity remaining in the bottom cover body 11 may be completely removed.

Next, in operation a-2), the non-conductive deposition layer 12 is formed on the front surface of the bottom cover member 10 in which the logo 1 and the outer frame 2 protrude three-dimensionally.

The non-conductive deposition layer 12 having a metallic color and material and formed on the front surface of the bottom cover body 11 is formed by depositing indium or an indium-containing alloy on the bottom cover body 11 by the NCVM method, wherein particles are deposited in an island-like form. Therefore, the non-conductive deposition layer 12 is formed to have an electromagnetic transmittance higher than that of a general deposition layer.

Here, the electromagnetic transmittance of the non-conductive deposition layer 12 may be adjusted according to a thickness of the non-conductive deposition layer 12. Therefore, when forming the non-conductive deposition layer 12, it is preferable to form the non-conductive deposition layer 12 by adjusting the thickness according to the specification of a sensor.

Next, in operation a-3), a surface of the non-conductive deposition layer 12 formed on the front surface of the bottom cover body 11 is coated with protective paint or a protective deposition material to form the protective layer 13.

The protective layer 13 formed on the surface of the non-conductive deposition layer 12 is preferably formed to have a thickness of 0.001 μm to 40 μm, the protective paint is preferably formed by applying heat or hot air at 70° C. to 90° C. for 90 to 180 minutes after curing, and the protective deposition material is preferably formed by chemical vapor deposition (CVD) simultaneously with non-conductive deposition.

Therefore, the bottom cover member 10 according to an embodiment of the present disclosure is prepared by forming the bottom cover body 11 by injection-molding, the non-conductive deposition layer 12 by depositing indium or an indium-containing alloy on the front surface of the injection-molded bottom cover body 11 using the NCVM method, and the protective layer 13 by coating a protective paint or a protective deposition material on a surface of the non-conductive deposition layer 12 formed on the front surface of the bottom cover body 11.

After the bottom cover member 10 is prepared in operation a) described above, in operation b), the top cover member 20 having a back surface formed in a shape corresponding to the logo 1, the outer frame 2, and the logo base 3 formed in the front surface of the bottom cover member 10 is prepared.

Hereinafter, operation b) of preparing the top cover member 20 will be described in detail.

In operation b-1), a transparent synthetic resin is injected by the injection mold to form the top cover body 21 having a back surface formed in a shape corresponding to the front surface of the bottom cover member 10.

The top cover body 21 is formed of the injection-molded transparent synthetic resin. The reason why the top cover body 21 is formed of a transparent synthetic resin is that the logo 1 and the outer frame 2 are viewed through the top cover body 21 so that the top cover body 21 may be seen three-dimensionally.

Next, in operation b-2), a hard coating layer 22 is formed on the front surface of the top cover body 21 by coating or injecting a hard coating material by the injection mold.

Figure 3:
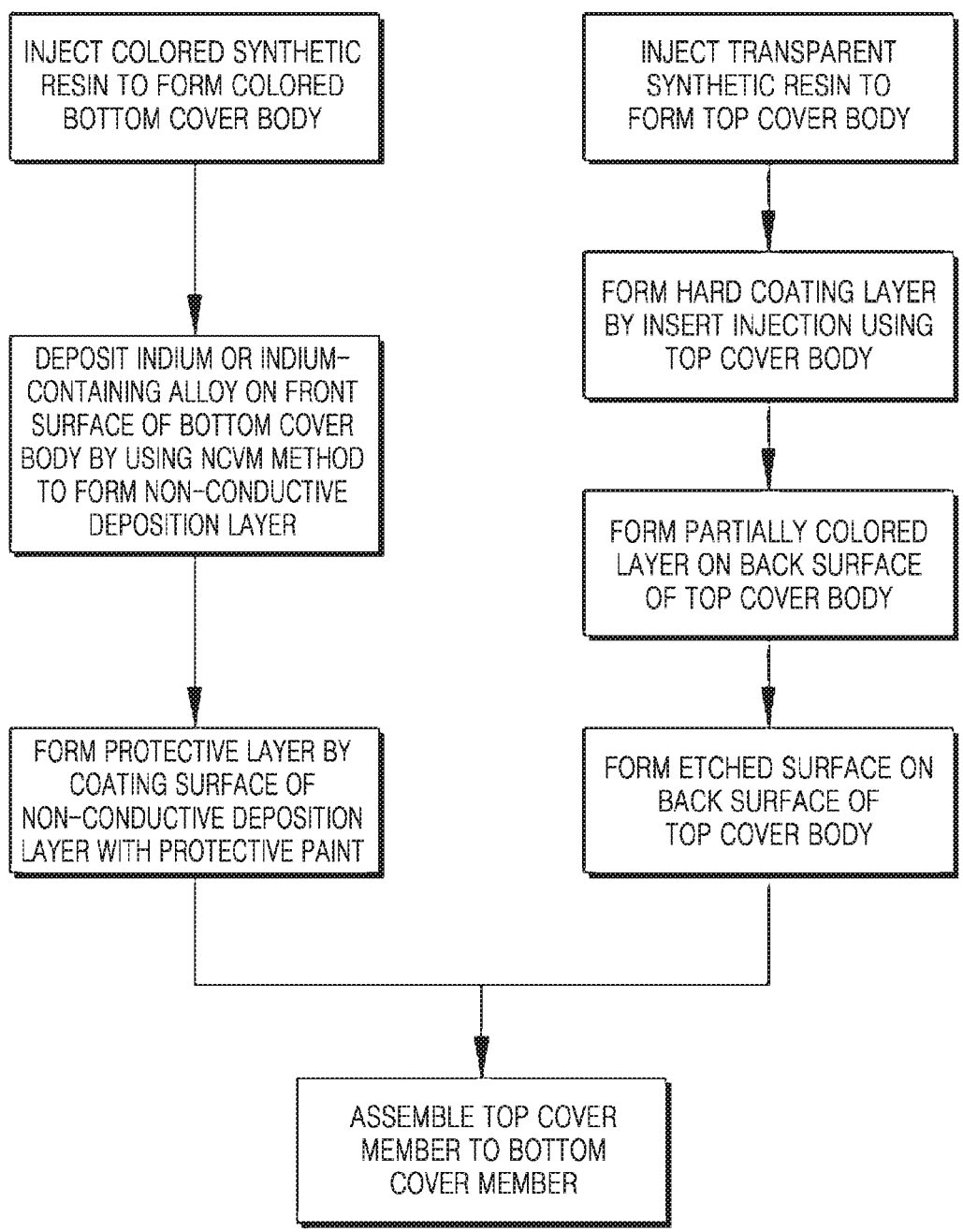
FIG. 3 is a schematic exemplary view of a method of manufacturing a vehicle cruise control sensor-cover, according to an embodiment of the present disclosure.
Figure 4:
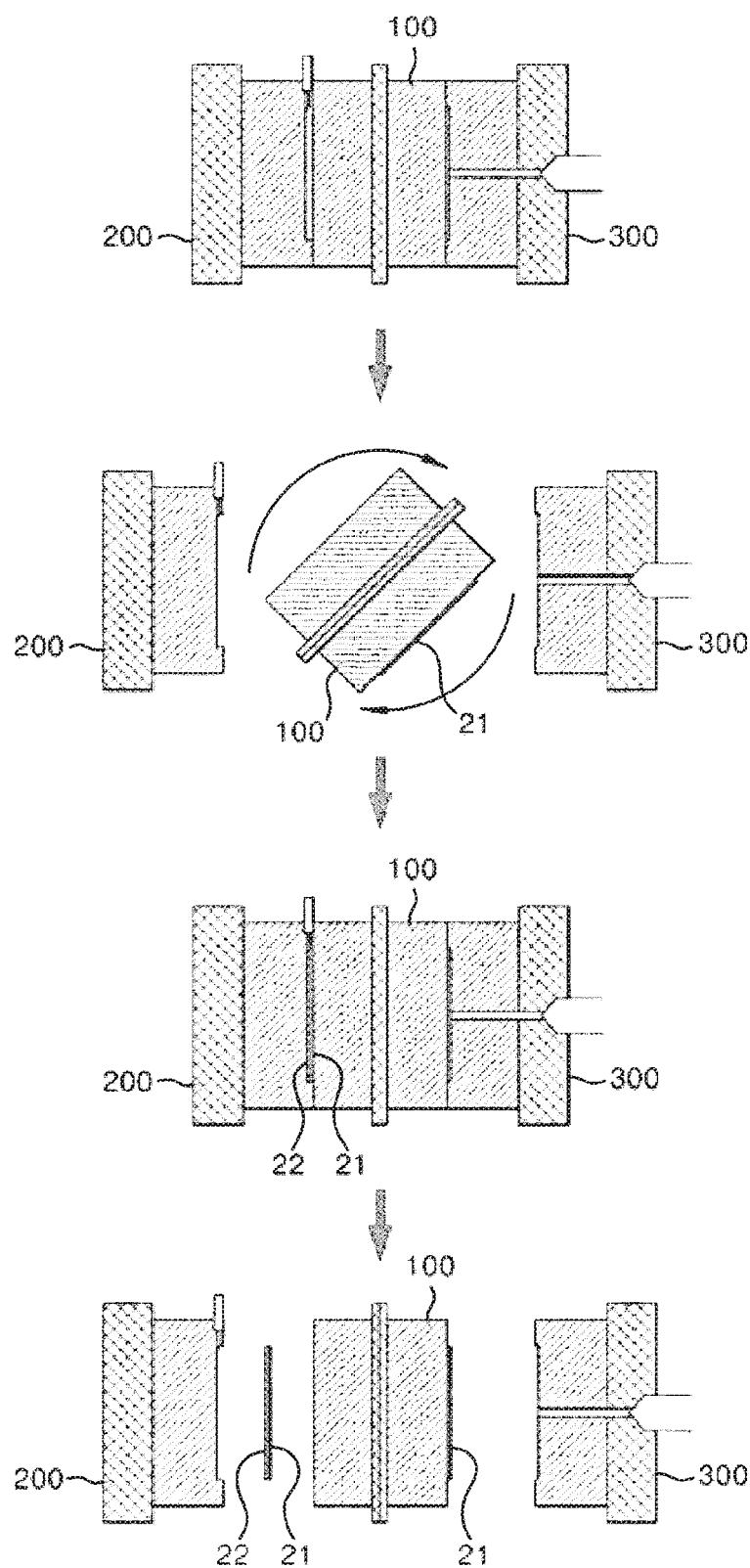
FIG. 4 is a schematic exemplary view of a process of injecting a top cover body and a hard coating layer, according to an embodiment of the present disclosure.

The hard coating layer 22 is formed on the front surface of the top cover body 21 by insert injection using the top cover body 21 formed by injection in operation b-1). The injection mold for forming the top cover member 20 according to an embodiment of the present disclosure is a double injection mold. In more detail, as shown in FIG. 3, the injection mold includes a rotary mold 100 which rotates selectively by 180°, a moving mold 200 on a left surface of the rotary mold 100 and selectively moving linearly and contacting the left surface of the rotary mold 100, and a fixed mold 300 on a right surface of the rotary mold 100 and selectively moving linearly and contacting the right surface of the rotary mold 100. A transparent synthetic resin is injected between the rotary mold 100 and the fixed mold 300 to form the top cover body 21, and a hard coating material is injected between the moving mold 200 and the rotary mold 100 so that the hard coating layer 22 is formed on the front surface of the top cover body 21.

Accordingly, when the top cover body 21 is formed by the injection of the transparent synthetic resin between the rotary mold 100 and the fixed mold 300, with opening of the injection mold, the rotary mold 100 is rotated 180° with the top cover body 21 being formed. When the rotation of the rotary mold 100 is completed, the injection mold is closed again and the hard cover layer 22 is formed on the front surface of the top cover body 21 by injecting a hard cover material while the top cover body 21 is inserted between the moving mold 200 and the rotary mold 100.

Here, it is preferable that the hard coating layer 22 is also formed of a transparent synthetic resin so that the front surface of the bottom cover member 10 is viewed through.

Next, in operation b-3), the bottom surface of the top cover body 21 is selectively partially colored to form the partially colored layer 23.

Here, paint is selectively partially coated on the back surface of the top cover body 21 in the shape corresponding to the logo 1, the outer frame 2, and the logo base 3 formed on the front surface of the bottom cover body 11, and the partially colored layer 23 is partially formed on the back surface of the top cover body 21.

For example, when the partially colored layer 23 is formed by coating paint on the bottom surface of the top cover body 21 in operation b-2), the partially colored layer 23 may be formed by coating paint only on the logo base 3 which is a portion of the top cover body 21 excluding the logo 1 and the outer frame 2. However, the present disclosure is not limited thereto. The partially colored layer 23 may be formed by coating paint only on the logo 1 and the outer frame 2 of the top cover body 21 which are portions of the top cover body 21 excluding the logo base 3.

Next, in operation b-4), laser etching is performed on the back surface of the top cover body 21 to form an etched surface.

Here, when the back surface of the top cover body 21 is etched, it is preferable to form the etched surface only on a portion of the back surface of the top cover body 21 corresponding to the logo 1 or the outer frame 2 by performing laser etching only on the portion of the back surface of the top cover body 21 corresponding to the logo 1 or the outer frame 2 excluding the logo base 3 on which the partially colored layer 23 is formed.

Light is reflected in multiple angles by a plurality of cutting surfaces formed on the etched logo 1 and the outer frame 2 when viewed from the outside on the etched surface so that the logo 1 and the outer frame 2 are more visible than the logo base 3.

Accordingly, the top cover member 20 is prepared by forming the transparent top cover body 21 and the hard coating layer 22 by coating or double injection so that the front surface of the bottom cover member 10 to be assembled to the back surface of the top cover member 20 may be projected, by forming the partially colored layer 23 by partially coloring any portion of the back surface of the top cover body 21 corresponding to the logo 1, the outer frame 2, and the logo base 3, and by forming an etched surface in a laser etching manner on the back surface of the top cover body 21 corresponding to a portion excluding the partially colored layer 23.

After the top cover member 20 is prepared in operation b) described above, in operation c), the top cover member 20 is assembled to the bottom cover member 10 after the back surface of the top cover member 20 is located on the front surface of the bottom cover member 10.

Here, silicon or an adhesive is applied between the bottom cover member 10 and the top cover member 20, and the top cover member 20 may be assembled to an upper surface of the bottom cover member 10 by the silicon or adhesive.

Accordingly, a vehicle cruise control sensor-cover that has a metallic color and material is abrasion resistant and weather resistant, ensures electromagnetic transparency of a cruise control sensor, and does not hinder logo design is provided by the above process.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and as defined by the following claims.

What is claimed is:

1. A vehicle cruise control sensor-cover comprising:
   a bottom cover member wherein indium or an indium-containing alloy is deposited, by using a non-conductive vacuum metallization (NCVM) method, on a front surface of a bottom cover body having a logo and an outer frame protruding three-dimensionally; and
   a top cover member comprising a transparent material and having a back surface formed in a shape corresponding to the front surface of the bottom cover member, wherein the top cover member is assembled integrally with the front surface of the bottom cover member, and a laser etching process is partially selectively performed only on a portion of the back surface of the top cover member corresponding to the logo or the outer frame to partially form an etched surface,
   wherein the bottom cover member comprises:
   the bottom cover body formed of a colored synthetic resin material and having the logo and the outer frame protruding three-dimensionally on the front surface of the bottom cover body;
   a non-conductive deposition layer formed on the front surface of the bottom cover body to secure electromagnetic transparency of the bottom cover body; and
   a protective layer coated on a front surface of the non-conductive deposition layer to protect the non-conductive deposition layer, and
   wherein the top cover member comprises:
   a transparent top cover body formed of a transparent synthetic resin material and having a back surface formed in the shape corresponding to the front surface of the bottom cover body;
   a hard coating layer formed on a front surface of the top cover body by a coating process or an injection process using an injection mold; and
   a partially colored layer formed by selectively coloring either of surfaces corresponding to the logo, the outer frame, and a logo base on the back surface of the top cover body.

\* \* \* \* \*